United States Patent
Takei et al.

(10) Patent No.: US 9,879,776 B2
(45) Date of Patent: Jan. 30, 2018

(54) PARKING DEVICE

(71) Applicant: AISIN AW CO., LTD., Anjo-shi, Aichi-ken (JP)

(72) Inventors: Tadamasa Takei, Nagoya (JP); Tomonari Okamoto, Anjo (JP); Takahiro Kokubu, Nishio (JP)

(73) Assignee: AISIN AW CO., LTD., Anjo-shi (JP)

( * ) Notice: Subject to any disclaimer, the term of this patent is extended or adjusted under 35 U.S.C. 154(b) by 0 days.

(21) Appl. No.: 15/116,111

(22) PCT Filed: Feb. 19, 2015

(86) PCT No.: PCT/JP2015/054606
§ 371 (c)(1),
(2) Date: Aug. 2, 2016

(87) PCT Pub. No.: WO2015/141371
PCT Pub. Date: Sep. 24, 2015

(65) Prior Publication Data
US 2017/0130839 A1    May 11, 2017

(30) Foreign Application Priority Data
Mar. 18, 2014    (JP) ................. 2014-054757

(51) Int. Cl.
*F16H 63/34* (2006.01)
*F16D 127/06* (2012.01)

(52) U.S. Cl.
CPC ..... *F16H 63/3483* (2013.01); *F16H 63/3425* (2013.01); *F16D 2127/06* (2013.01)

(58) Field of Classification Search
None
See application file for complete search history.

(56) References Cited

U.S. PATENT DOCUMENTS

2008/0302627 A1    12/2008   Kato et al.
2011/0198190 A1    8/2011    Steinhauser et al.

FOREIGN PATENT DOCUMENTS

JP    2008-128444 A    6/2008
JP    2008-302768 A    12/2008

OTHER PUBLICATIONS

International Search Report for PCT/JP2015/054606 dated Apr. 28, 2015.

*Primary Examiner* — Mark A Manley
(74) *Attorney, Agent, or Firm* — Sughrue Mion, PLLC (57) ABSTRACT

When an oil temperature Toil is equal to or lower than a threshold Toref, and when a vehicle is predicted to stop while traveling (a shift position is predicted to be operated to a parking position), restricted discharge processing is executed in which a magnetic lock device is turned ON and an on-off solenoid valve is turned OFF. Thus, discharge of hydraulic oil in an oil chamber is started while movement of a piston rod is restricted by the magnetic lock device. Then, when the vehicle stops and the shift position is changed to a parking position, the restriction on the movement of the piston rod is removed by turning OFF the magnetic lock device.

10 Claims, 6 Drawing Sheets

PARKING DEVICE

TECHNICAL FIELD

The present disclosure relates to a parking device, and particularly to a parking device that is mounted on a vehicle and establishes a parking lock state and a parking lock release state.

BACKGROUND ART

Conventionally, there has been proposed a parking device of this type that includes a piston, a housing accommodating the piston, a spring that urges the piston in a parking lock execution direction by the elastic force, and a solenoid valve that moves the piston in a parking lock release direction by supplying hydraulic oil from a mechanical pump to a hydraulic oil chamber defined by the piston and the housing (see, for example, Patent Document 1). In this parking device, when moving the piston in the parking lock release direction and maintaining the piston in that state, hydraulic oil is supplied from the mechanical pump to the hydraulic oil chamber via the solenoid valve. On the other hand, when moving the piston in the parking lock execution direction, hydraulic oil is discharged from the hydraulic oil chamber via the solenoid valve.

RELATED ART DOCUMENTS

Patent Documents

Patent Document 1: United States Patent Application Publication No. 2011/0198190

SUMMARY

Usually, in such a parking device, when execution of parking lock is requested by an operation of the shift lever to a parking position or the like, discharge of hydraulic oil in the hydraulic oil chamber is started. A certain amount of time is required to discharge hydraulic oil, due to the passage resistance of an oil passage between the solenoid valve and the hydraulic oil chamber and so on. Therefore, a certain amount of time is required to move the piston in the parking lock execution direction (establish a parking lock state) after execution of parking lock is requested.

It is a main object of a parking device according to the present disclosure to reduce the time required to establish a parking lock state from when establishment of a parking lock state is requested.

In order to achieve the above main object, the parking device according to the present disclosure employs the following.

The parking device according to the present disclosure is mounted on a vehicle and establishes a parking lock state and a parking lock release state, the parking device including:

a moving member that moves in a first direction;

a first elastic member that urges the moving member to a lock side in the first direction by an elastic force of the first elastic member to establish the parking lock state;

hydraulic oil supply for moving the moving member to a lock release side in the first direction to establish the parking lock release state, by supplying hydraulic oil to a hydraulic oil chamber defined by the moving member and a housing accommodating the moving member;

a movement restriction unit that restricts movement of the moving member in the first direction and removes the restriction; and controller for, when the parking lock release state is established and before establishment of the parking lock state is requested, executing restricted discharge processing of causing the hydraulic oil supply to discharge the hydraulic oil in the hydraulic oil chamber under the restriction by the movement restriction unit on the movement of the moving member to the lock side, and when the vehicle stops and establishment of the parking lock state is requested, removing the restriction by the movement restriction unit on the moving member.

In the parking device according to the present disclosure, when the parking lock release state is established and before establishment of the parking lock state is requested, restricted discharge processing of causing the hydraulic oil supply to discharge the hydraulic oil in the hydraulic oil chamber under the restriction by the movement restriction unit on the movement of the moving member to the lock side is executed, and when the vehicle stops and establishment of the parking lock state is requested, the restriction by the movement restriction unit on the moving member is removed. That is, before establishment of the parking lock state is requested, the hydraulic oil in the hydraulic oil chamber is discharged by the hydraulic oil supply, while maintaining the parking lock release state by causing the movement restriction unit to restrict the movement of the moving member to the lock side. Further, when establishment of the parking lock state is requested, the restriction by the movement restriction unit on the moving member is removed, and thus the moving member is moved to the lock side by the elastic force of the first elastic member, so that the parking lock state is established. Accordingly, compared to the configuration in which discharge of the hydraulic oil in the hydraulic oil chamber is started after establishment of the parking lock state is requested, it is possible to reduce the time required to establish the parking lock state from when establishment of the parking lock state is requested. Here, a time "before establishment of the parking lock state is requested" may be a time when a shift lever is predicted to be operated to a parking position. Further, the time "when the shift lever is predicted to be operated to the parking position" may be a time when a vehicle speed is reduced to a predetermined vehicle speed or less, especially a time when the vehicle speed is reduced to a predetermined vehicle speed or less after exceeding the predetermined speed (a time when the vehicle speed is reduced to the predetermined vehicle speed or less upon deceleration while the vehicle is traveling). Further, "a request of establishment of the parking lock state" may be an operation of a shift lever to a parking position.

BRIEF DESCRIPTION OF THE PREFERRED EMBODIMENT

Hereinafter, a mode for carrying out the present disclosure will be described.

Figure 1:
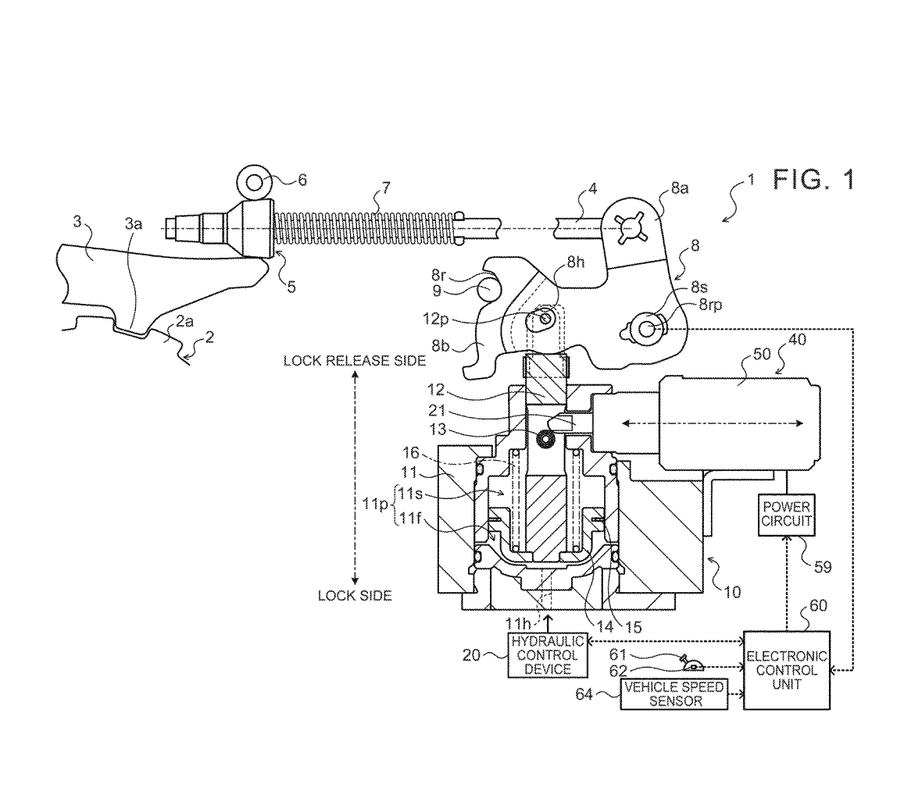
FIG. 1 is a configuration diagram illustrating a schematic configuration of a parking device 1.
Figure 2:
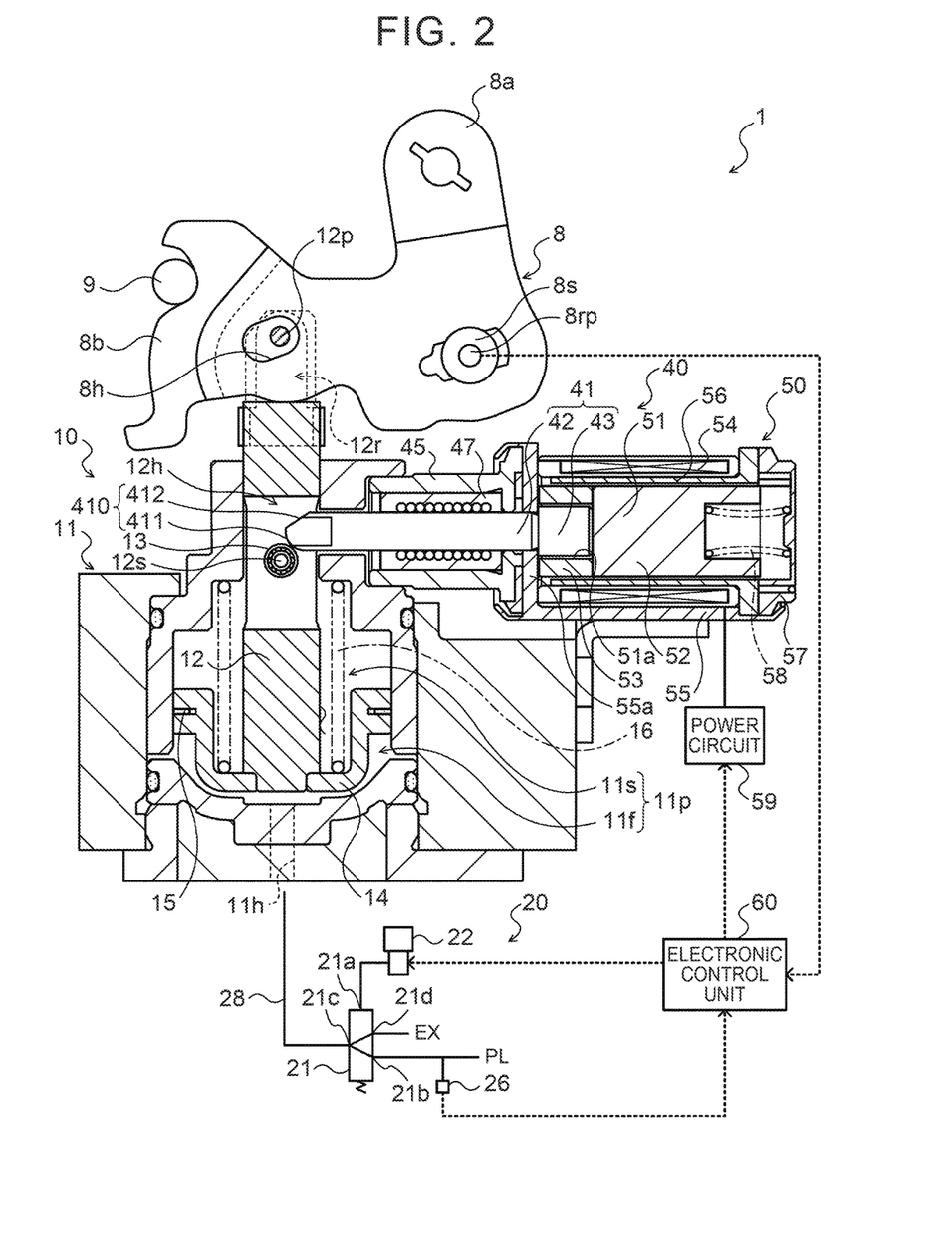
FIG. 2 is a configuration diagram illustrating a schematic configuration of a main part of the parking device 1.
Figure 3:
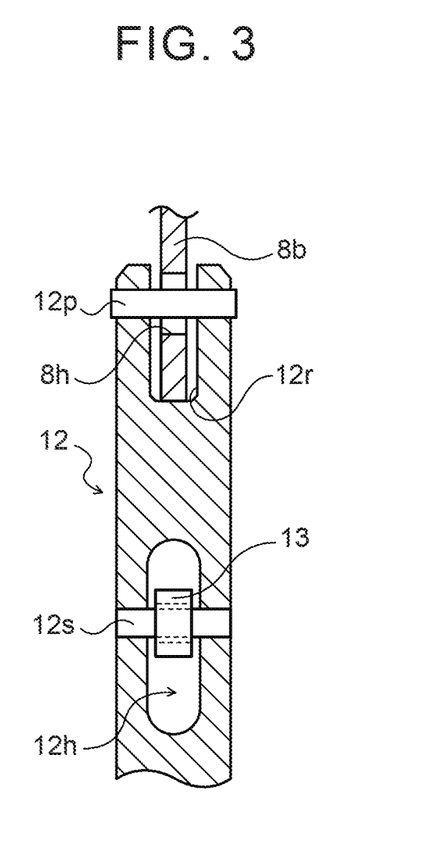
FIG. 3 is a configuration diagram illustrating a schematic configuration of a part of a hydraulic actuator 10.

FIG. 1 is a configuration diagram illustrating a schematic configuration of a parking device 1 according to an embodiment of the present disclosure. FIG. 2 is a configuration diagram illustrating a schematic configuration of a main part of the parking device 1. FIG. 3 is a configuration diagram illustrating a schematic configuration of a part of a hydraulic actuator 10.

The parking device 1 of this embodiment is mounted on a vehicle, and is disposed inside or outside a transmission case of a transmission (not illustrated). The parking device 1 is configured as a so-called shift-by-wire parking device that locks a rotary shaft of the transmission (execute parking lock) and unlocks the rotary shaft (release parking lock) on the basis of an electric signal output in accordance with the operation position (shift position) of a shift lever 61.

As illustrated in FIGS. 1 and 2, the parking device 1 includes: a parking gear 2 having a plurality of teeth 2a and attached to a rotary shaft of the transmission; a parking pawl 3 having a projection 3a that is engageable with the parking gear 2 and urged to be away from the parking gear 2 by a spring (not illustrated); a parking rod 4 that is advanceable and retractable; a tubular cam member 5 that is movable in the axial direction of the parking rod 4; a support roller 6 rotatably supported by the transmission case, for example, and holding the cam member 5 together with the parking pawl 3; a cam spring 7 having one end supported by the parking rod 4 and urging the cam member 5 such that the parking pawl 3 is pressed against the parking gear 2; a detent lever 8 coupled to the parking rod 4; a hydraulic actuator 10 that advances and retracts the parking rod 4 via the detent lever 8 through advancing and retracting movement (movement in the up-down direction in FIGS. 1 and 2) of a piston rod 12; a hydraulic control device 20 that supplies hydraulic oil to an engagement element of the transmission and the hydraulic actuator 10; a magnetic lock device 40 that restricts the advancing and retracting movement of the piston rod 12 such that the advancing and retracting movement of the parking rod 4 is restricted; and an electronic control unit 60 used for controlling the transmission and the parking device 1 (the hydraulic actuator 10 and the magnetic lock device 40). In the parking device 1, as illustrated in FIG. 1, the projection 3a of the parking pawl 3 engages a recess between two adjacent teeth 2a of the parking gear 2, so that the rotary shaft of the transmission is locked (parking lock is executed).

Each of the parking gear 2, the parking pawl 3, the parking rod 4, the cam member 5, the support roller 6, and the cam spring 7 has a well-known configuration. The detent lever 8 is formed in a substantially L-shape, and includes a first free end portion 8a and a second free end portion 8b. The first free end portion 8a is rotatably coupled to a base end portion (right end portion in the figure) of the parking rod 4. In the second free end portion 8b, an engagement recess 8r is formed that is engageable with an engagement member 9 attached to a detent spring (not illustrated) supported by the transmission case, for example. A corner portion of the detent lever 8 (the base end portion of the first and second free end portions 8a and 8b) is turnably supported by a support shaft 8s supported by the transmission case, for example.

When the piston rod 12 of the hydraulic actuator 10 moves upward in the figure (hereinafter referred to as a "lock release side" as appropriate), the detent lever 8 turns clockwise in FIG. 1 about the support shaft 8s, and the parking rod 4 moves to the right in FIG. 1. Then, when the parking rod 4 moves to the right in FIG. 1, pressing of the parking pawl 3 by the cam member 5 is released, so that engagement between the parking gear 2 and the parking pawl 3 (lock of the rotary shaft of the transmission) is released (parking lock is released).

On the other hand, when the piston rod 12 moves downward in the figure (hereinafter referred to as a "lock side"), the detent lever 8 turns counterclockwise in FIG. 1 about the support shaft 8s, and the parking rod 4 moves to the left in FIG. 1. Then, when the parking rod 4 moves to the left in FIG. 1, the parking pawl 3 is pressed by the cam member 5, which is urged by the cam spring 7, to engage the parking gear 2, so that the rotary shaft of the transmission is locked (parking lock is executed). Note that with the engagement between the engagement recess 8r of the second free end portion 8b of the detent lever 8 and the engagement member 9, turning of the detent lever 8 about the support shaft 8s is restricted to some extent by a detent spring (not illustrated), so that the movement of the parking rod 4 is also restricted to some extent.

As illustrated in FIG. 2, the hydraulic actuator 10 includes: a case 11 serving as a housing including a plurality of members; the piston rod 12 serving as a moving member coupled to the second free end portion 8b of the detent lever 8 and supported by the case 11 such that the piston rod 12 is movable in the axial direction (up-down direction in FIG. 2); and a piston 14 fixed to the piston rod 12 and disposed in a piston chamber 11p formed in the case 11.

The piston rod 12 is supported by the case 11 such that the distal end portion (upper end portion in FIG. 2) thereof projects out of the case 11. As illustrated in FIG. 3, a coupling recess 12r extending from the distal end side toward the base end side is formed in the distal end portion of the piston rod 12, and the second free end portion 8b of the detent lever 8 is inserted into the coupling recess 12r. An elongated hole 8h is formed in the detent lever 8 so as to be located in the coupling recess 12r. A coupling pin 12p supported by the distal end portion of the piston rod 12 is inserted through the elongated hole 8h. The elongated hole 8h is formed such that a space is defined between the inner periphery thereof and the outer peripheral surface of the coupling pin 12p. Thus, the piston rod 12 and the detent lever 8 are coupled so as to allow some relative movement with respect to each other.

Further, a hole portion 12h penetrating the piston rod 12 in a direction (left-right direction in FIG. 2) orthogonal to the axial direction and extending in the axial direction is formed around the center portion of the piston rod 12 in the axial direction. A roller 13 serving as an abutted portion is disposed inside the hole portion 12h. The roller 13 is configured as a roller bearing, and has an outside diameter that is smaller than the length of the hole portion 12h in the longitudinal direction (up-down direction in FIGS. 2 and 3). The roller 13 is rotatably supported in the hole portion 12h by a support shaft 12s supported by the piston rod 12 so as to extend in parallel to the coupling pin 12p.

The piston 14 is fixed to the base end portion (lower end portion in FIG. 2) of the piston rod 12, and supported by the inner wall surface of the piston chamber 11*p* via a seal member 15 so as to be movable in the axial direction of the piston rod 12. The piston 14 partitions the inside of the piston chamber 11*p* into a spring chamber 11*s* and an oil chamber 11*f*. The spring chamber 11*s* is defined at the upper side of the piston chamber 11*p* in FIG. 2 so as to be close to the distal end portion of the piston rod 12 and the detent lever 8. A return spring 16 serving as an elastic member is disposed in the spring chamber 11*s* so as to be located between the case 11 and the piston 14. The piston 14 is urged to the lock side (lower side in the figure) by the return spring 16. The oil chamber 11*f* is defined at the lower side of the piston chamber 11*p* in FIG. 2 so as to be away from the distal end portion (upper end portion in the figure) of the piston rod 12 and the detent lever 8, and communicates with the hydraulic control device 20 via an oil hole 11*h* formed in the case 11. The piston rod 12 and the piston 14 are moved to the lock release side (upper side in the figure) against the urging force of the return spring 16, by hydraulic oil (hydraulic pressure) supplied from the hydraulic control device 20 to the oil chamber 11*f*.

The hydraulic control device 20 is connected to an oil pump that operates with power from the engine. The hydraulic control device 20 includes: a primary regulator valve that regulates the pressure of hydraulic oil from the oil pump to generate a line pressure PL; a modulator valve that regulates the line pressure PL to generate a substantially constant modulator pressure Pmod; a switching valve 21 that switches between a first state in which the line pressure PL is supplied to the oil chamber 11*f* via an oil passage 28 and the oil hole 11*h* and a second state in which the hydraulic oil in the oil chamber 11*f* and the oil passage 28 is discharged (drained); and an on-off solenoid valve 22 that drives the switching valve 21.

The on-off solenoid valve 22 is configured to be able to output the line pressure PL and the modulator pressure Pmod as signal pressures to the switching valve 21. The switching valve 21 is configured as a spool valve that includes: a sleeve in which various ports are formed such as a signal pressure input port 21*a* to which a signal pressure from the on-off solenoid valve 22 is input, an input port 21*b* to which the line pressure PL is input, an output port 21*c* communicating with the oil passage 28, and a drain port 21*d*; a spool that slides in the sleeve in the axial direction; and a spring that urges the spool to one side in the axial direction. In the switching valve 21, when a signal pressure is supplied from at least one on-off solenoid valve 22 to the signal pressure input port 21*a*, the spool is moved to the other side in the axial direction against the urging force of the spring to allow communication between the input port 21*b* and the output port 21*c* and to block communication between the input port 21*b* and the drain port 21*d*, so that the first state is established. When no signal pressure is supplied from the on-off solenoid valve 22 to the signal pressure input port 21*a*, the spool is urged to the one side in the axial direction by the urging force of the spring to allow communication between the output port 21*c* and the drain port 21*d* and to block communication between the input port 21*b* and the output port 21*c*, so that the second state is established.

As illustrated in FIG. 2, the magnetic lock device 40 includes: a lock shaft 41 having an abutting portion 410 that can abut against the roller 13 serving as an abutted portion provided in the piston rod 12; a shaft holder 45 that supports the lock shaft 41 via a linear motion bearing 47 such that the lock shaft 41 is movable in the axial direction (left-right direction in the figure); and a magnetic portion 50 that can lock the lock shaft 41 by its magnetic force.

The lock shaft 41 is formed of a non-magnetic body such as stainless steel. The lock shaft 41 includes a small diameter portion 42 having the abutting portion 410 on one end portion (distal end portion) thereof, and a large diameter portion 43 extending from the small diameter portion 42 to a side opposite to the abutting portion 410 and having a diameter greater than the small diameter portion 42. The small diameter portion 42 is formed in a substantially cylindrical shape, and the abutting portion 410 formed on the distal end portion thereof is formed to have a width across flat shape. The abutting portion 410 is located in the hole portion 12*h* of the piston rod 12, and at least partially overlaps the outer peripheral surface of the roller 13 as viewed from the axial direction (up-down direction in the figure) of the piston rod 12. The large diameter portion 43 is formed in a substantially cylindrical shape.

The abutting portion 410 of the small diameter portion 42 has a first abutting surface 411 located on the lock side (lower side in the figure) in the moving direction of the piston rod 12 (up-down direction in the figure), and a second abutting surface 412 located on the lock release side (upper side in FIG. 2) in the moving direction of the piston rod 12. The first abutting surface 411 is formed so as to be inclined toward the lock side from the abutting portion 410 side toward the large diameter portion 43. Specifically, the first abutting surface 411 is formed as a curved surface with an arc shape in cross section having a radius of curvature smaller than the radius (radius of curvature) of the outer peripheral surface of the roller 13 and being convex toward the lock side. The second abutting surface 412 is formed so as to be inclined toward the lock release side from the abutting portion 410 side toward the large diameter portion 43. Specifically, the second abutting surface 412 is formed as a (flat) inclined surface that is inclined toward the lock release side at a constant angle.

The magnetic portion 50 includes: a shaft member 51 that is movable in the axial direction (left-right direction in FIG. 2); a coil 54 disposed such that the coil 54 surrounds the outer periphery of the shaft member 51; a yoke 55 serving as a case that holds the shaft holder 45 and accommodates the shaft member 51 and the coil 54; a core 56 disposed between the shaft member 51 and the coil 54; a rear cap 57 that is mounted on the right end portion (figure) of the yoke 55 such that the rear cap 57 holds the coil 54 and the core 56; and a spring 58 serving as an elastic member that is disposed between the shaft member 51 and the rear cap 57 and urges the shaft member 51 toward the piston rod 12 (to the left in the figure).

The shaft member 51 includes a plunger 52 formed of a magnetic body such as iron, a plunger 52 formed of a magnetic body such as iron, and an annular permanent magnet 53 (formed integrally with the plunger 52). The permanent magnet 53 has the same outside diameter as that of the plunger 52 and is fixed to one end side (left end side in the figure) of the plunger 52 in the axial direction. The shaft member 51 has a recess 51*a* defined by the annular permanent magnet 53, on one end side in the axial direction. The large diameter portion 43 of the lock shaft 41 is inserted into the recess 51*a*. The coil 54 has a terminal connected to a connector (not illustrated) attached to the yoke 55. A current is applied to the coil 54 from a vehicle auxiliary battery (not illustrated) via a power circuit 59 controlled by the electronic control unit 60 and the connector. The yoke 55 is formed of a magnetic body such as iron and has a flange portion 55*a* projecting radially inward on one end side (left end side in the figure). The flange portion 55a has an inside diameter that allows sliding movement of the small diameter portion 42 of the lock shaft 41, and faces the large diameter portion 43 of the lock shaft 41 and the permanent magnet 53 of the shaft member 51 in the left-side direction in the figure. The spring 58 has a spring constant (rigidity) smaller than that of the return spring 16 of the hydraulic actuator 10. The spring 58 urges the lock shaft 41 and the shaft member 51, which are not fixed to each other, toward the piston rod 12 (to the left in the figure). Further, when an external force toward the rear cap 57 (toward the right in the figure) greater than the urging force (elastic force) of the spring 58 is applied to the lock shaft 41, the spring 58 allows the lock shaft 41 and the shaft member 51 to move toward the rear cap 57.

In the magnetic lock device 40, when the coil 54 is not energized, the lock shaft 41 and the shaft member 51 (the plunger 52 and the permanent magnet 53) are urged together toward the shaft holder 45 (toward the left in the figure) and locked by the attraction force between the permanent magnet 53 of the shaft member 51 and the flange portion 55a of the yoke 55 (and the elastic force of the spring 58). Thus, when the roller 13 of the piston rod 12 and the abutting portion 410 of the lock shaft 41 abut against each other, the movement of the piston rod 12 in the up-down direction in the figure is restricted. On the other hand, when the coil 54 is energized, the attraction force between the permanent magnet 53 and the flange portion 55a is canceled by magnetic flux passing through the yoke 55, the permanent magnet 53, the plunger 52, and the core 56. Thus, when a force is applied from the roller 13 of the piston rod 12 to the abutting portion 410 of the lock shaft 41, the lock shaft 41 and the shaft member 51 are allowed to move toward the rear cap 57 by a rightward component (figure) of the force. Thus, the piston rod 12 is allowed to be moved in the up-down direction in the figure. In the following, it is assumed that the magnetic lock device 40 is ON when the coil 54 is not energized (the movement of the piston rod 12 can be restricted), and the magnetic lock device 40 is OFF when the coil 54 is energized (the movement of the piston rod 12 is allowed).

Although not illustrated, the electronic control unit 60 is configured as a CPU-based microprocessor, and includes a ROM that stores processing programs, a RAM that temporarily stores data, input and output ports, and a communication port, in addition to the CPU. The electronic control unit 60 receives, via the input port, input of data such as a rotation position θ of the detent lever 8 from a rotation position detection sensor (for example, magnetic sensor) 8rp that detects the rotation position of the detent lever 8; an oil temperature Toil from a temperature sensor 26 that detects the temperature of the hydraulic oil in the hydraulic control device 20; an accelerator operation amount from an accelerator pedal position sensor that detects a depression amount (operation amount) of an accelerator pedal; a shift position SP from a shift position sensor 62 that detects the position of the shift lever 61; and a vehicle speed V from a vehicle speed sensor 64 that detects the vehicle speed. The electronic control unit 60 outputs a drive control signal to the hydraulic control device 20, a drive control signal to the power circuit 59, and so on, via the output port.

In the following, a description will be given of the operation of the parking device 1 thus configured.

First, a description will be given of the operation performed when switching from the parking lock state illustrated in FIG. 2 to the parking lock release state by moving the piston rod 12 upward in the figure by hydraulic pressure.

Note that when the shift position SP input from the shift position sensor 62 is the parking position and the parking lock state is established, the electronic control unit 60 outputs an ON command for the magnetic lock device 40 (non-energization command for the coil 54) to the power circuit 59 such that the magnetic lock device 40 is turned ON (such that the movement of the piston rod 12 can be restricted). Further, the electronic control unit 60 outputs an OFF command to the on-off solenoid valve 22 of the hydraulic control device 20 (signal pressure output stop command) such that the on-off solenoid valve 22 is turned OFF (such that no signal pressure is output). Thus, the switching valve 21 establishes the second state, so that the line pressure PL is not supplied to the oil chamber 11f of the hydraulic actuator 10. Therefore, the piston 14 of the hydraulic actuator 10 is urged downward in FIG. 2 by the return spring 16 so as to be located closest to or abut against the bottom portion of the case 11. At this point, in this embodiment, a first predetermined interval is formed between the roller 13 and the first abutting surface 411 of the lock shaft 41.

Figure 4:
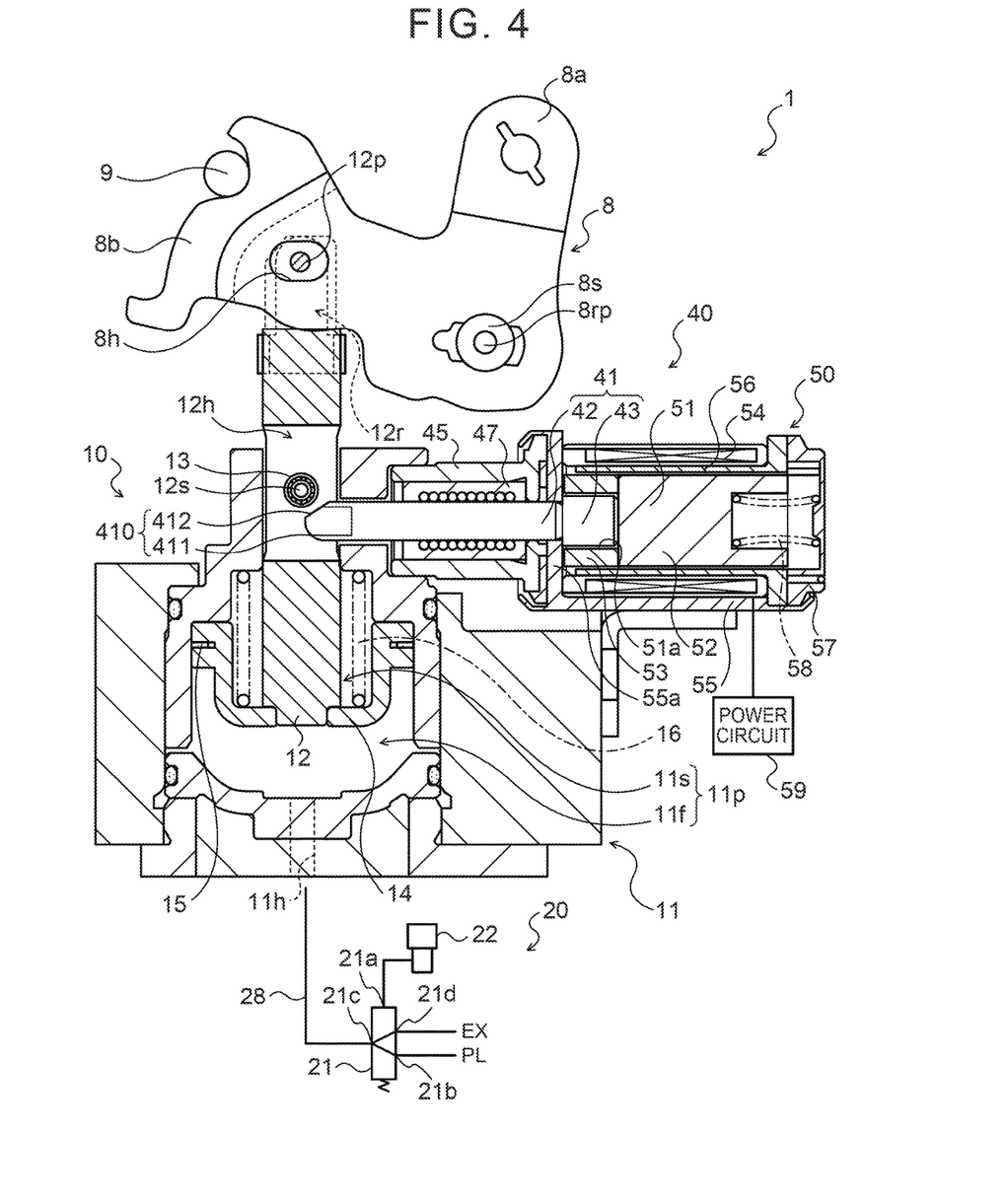
FIG. 4 is an explanatory diagram for illustrating the operation of the parking device 1.

Then, when the shift position SP is changed from the parking position to the drive position upon putting the engine into operation, in order to switch from the parking lock state to the parking lock release state, the electronic control unit 60 outputs an OFF command for the magnetic lock device 40 (energization command for the coil 54) to the power circuit 59 such that the magnetic lock device 40 is turned OFF (the movement of the piston rod 12 is allowed). Further, the electronic control unit 60 outputs an ON command to the on-off solenoid valve 22 (signal pressure output command) such that the on-off solenoid valve 22 is turned ON (such that a signal pressure is output). Thus, the switching valve 21 establishes the first state, so that the line pressure PL is supplied to the oil chamber 11f of the hydraulic actuator 10. Then, when the line pressure PL is supplied to the oil chamber 11f, the piston rod 12 and the piston 14 are moved to the lock release side (upper side in the figure) against the urging force of the return spring 16, by the hydraulic pressure. Then, when the roller 13 of the piston rod 12 and the first abutting surface 411 of the lock shaft 41 abut against each other, the piston rod 12 and the piston 14 move further to the lock release side while moving the lock shaft 41 and the shaft member 51 toward the rear cap 57 by a rightward component (FIG. 2) of the force applied from the roller 13 to the first abutting surface 411, and stop at a position such that a second predetermined interval is formed between the roller 13 and the second abutting surface 412 of the lock shaft 41 as illustrated in FIG. 4. Note that when the abutment between the roller 13 and the first abutting surface 411 ends, the lock shaft 41 and the shaft member 51 move toward the piston rod 12 (to the left in FIG. 2) due to the urging force of the spring 58. When the piston rod 12 thus moves to the lock release side, the detent lever 8 turns clockwise in FIG. 1 about the support shaft 8s, and the parking rod 4 moves to the right in FIG. 1, as described above. Then, the parking rod 4 moves to the right in FIG. 1, and pressing of the parking pawl 3 by the cam member 5 is released, so that the parking lock release state is established. Then, when the parking lock release state is established, the electronic control unit 60 turns ON the magnetic lock device 40.

Figure 5:
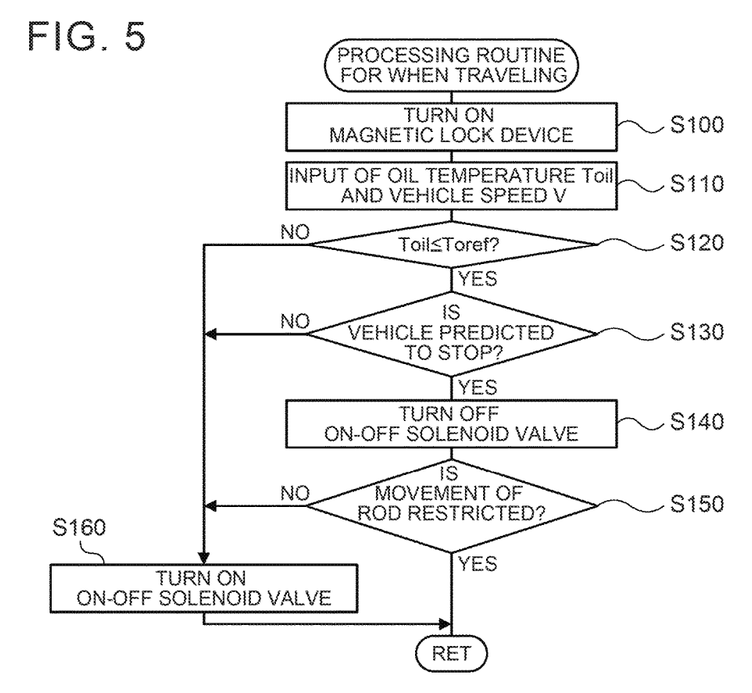
FIG. 5 is a flowchart illustrating an example of a processing routine for when traveling.

When the parking lock release state illustrated in FIG. 4 is established in the manner described above, the electronic control unit 60 executes a processing routine for when traveling, which is illustrated in FIG. 5. This routine is repeatedly executed while the vehicle is travelling.

When the processing routine for when traveling is executed, the electronic control unit 60 first maintains the magnetic lock device 40 in the ON state if in the ON state, and turns ON the magnetic lock device 40 if in the OFF state (step S100).

Then, the electronic control unit 60 receives input of data such as the oil temperature Toil from the temperature sensor 26 and the vehicle speed V from the vehicle speed sensor 64 (step S110), and compares the input oil temperature Toil with a threshold Toref (step S120). The threshold Toref is used for determining whether the viscosity of the hydraulic oil in the hydraulic control device 20 and the oil chamber 11f is relatively high, and may be 0° C. or 10° C., for example.

When the oil temperature Toil is higher than the threshold Toref, the viscosity of the hydraulic oil in the hydraulic control device 20 and the oil chamber 11f is determined not to be very high. Thus, the electronic control unit 60 maintains the on-off solenoid valve 22 in the ON state if in the ON state, and turns ON the on-off solenoid valve 22 if in the OFF state (step S160). Then, this routine ends. In this case, the parking lock release state is maintained by the hydraulic pressure supplied from the hydraulic control device 20 to the oil chamber 11f.

When the oil temperature Toil is equal to or lower than the threshold Toref, the viscosity of the hydraulic oil in the hydraulic control device 20 and the oil chamber 11f is determined to be relatively high. Thus, the electronic control unit 60 determines whether the vehicle is predicted to stop (the shift position SP is predicted to be operated to the parking position) (step S130). This determination may be made based on, for example, whether the vehicle speed V is reduced to a threshold Vref or less after exceeding the threshold Vref once (whether the vehicle speed V is reduced to the threshold Vref or less upon deceleration while the vehicle is traveling). The threshold Vref may be 5 km/h or 7 km/h, for example. Alternatively, the electronic control unit 60 may determine that the vehicle is predicted to stop (the shift position SP is predicted to be operated to the parking position) when the vehicle speed V is reduced to 0 km/h and the vehicle is stationary.

When the vehicle is not predicted to stop (when the shift position SP is not predicted to be operated to the parking position), the electronic control unit 60 maintains the on-off solenoid valve 22 in the ON state if in the ON state, and turns ON the on-off solenoid valve 22 if in the OFF state (step S160). Then, this routine ends. In this case, the parking lock release state is maintained by the hydraulic pressure supplied from the hydraulic control device 20 to the oil chamber 11f.

When the vehicle is predicted to stop (when the shift position SP is predicted to be operated to the parking position), the electronic control unit 60 maintains the on-off solenoid valve 22 in the OFF state if in the OFF state, and turns OFF the on-off solenoid valve 22 if in the ON state (step S140). Thus, the switching valve 21 is maintained in the second state if in the second state (if the switching valve 21 was switched into the second state in the previous execution of this routine), and is switched into the second state if in the first state. When the switching valve 21 is in the second state, the line pressure PL is not supplied to the oil chamber 11f of the hydraulic actuator 10, and the hydraulic oil in the oil chamber 11f and the oil passage 28 is discharged from the drain port 21d of the switching valve 21 via the oil hole 11h and the oil passage 28. When the hydraulic oil in the oil chamber 11f is discharged (when discharge is started), the piston rod 12 and the piston 14 move to the lock side (lower side in FIG. 4) due to the urging force of the return spring 16, so that the roller 13 in the piston rod 12 abuts against the second abutting surface 412 of the lock shaft 41. Although the piston rod 12 and the piston 14 attempt to move to the lock side (lower side in FIG. 4) while moving the lock shaft 41 and the shaft member 51 toward the rear cap 57 by the rightward component (FIG. 4) of the force applied from the roller 13 to the second abutting surface 412, the movement is restricted because the magnetic lock device 40 is ON. Thus, the parking lock release state is maintained. The processing of discharging the hydraulic oil in the oil chamber 11f and the oil passage 28 while the movement of the piston rod 12 to the lock side is restricted by the magnetic lock device 40 is hereinafter referred to as restricted discharge processing.

Then, the electronic control unit 60 determines whether the movement of the piston rod 12 is restricted by the restricted discharge processing (step S150). This determination is for determining whether the magnetic lock device 40 is normally turned ON, and may be made based on, for example, whether the rotation position θ of the detent lever 8 input from the rotation position detection sensor 8rp is maintained for a predetermined period of time (a few hundred milliseconds, for example).

When the movement of the piston rod 12 is restricted by the restricted discharge processing, the magnetic lock device 40 is determined to be normally turned ON. Then, this routine ends without making any change. On the other hand, when the movement of the piston rod 12 is not restricted by the restricted discharge processing, the magnetic lock device 40 is determined not to be normally turned ON, and the on-off solenoid valve 22 is turned ON (step S160). Then, this routine ends. Thus, the parking lock release state is maintained by the hydraulic pressure supplied from the hydraulic control device 20 to the oil chamber 11f. Accordingly, it is possible to prevent the parking device 1 from switching to the parking lock state.

Figure 6:
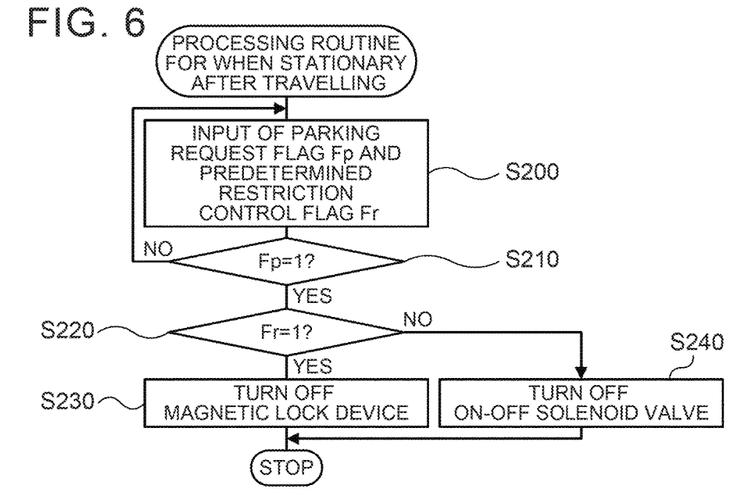
FIG. 6 is a flowchart illustrating an example of a processing routine for when stationary after travelling.

After that, when the vehicle stops, the electronic control unit 60 executes a processing routine for when stationary after travelling, which is illustrated in FIG. 6. When the processing routine for when stationary after traveling is executed, the electronic control unit 60 receives input of data such as a parking request flag Fp indicating whether a parking request is made by the driver and the restricted discharge processing flag Fr indicating whether the restricted discharge processing is executed (step S200). Note that the electronic control unit 60 receives the input by reading the parking request flag Fp whose value is set to 0 when the shift position SP input from the shift position sensor 62 is not changed to the parking position and whose value is set to 1 when the shift position SP is changed from the drive position to the parking position. Further, the electronic control unit 60 receives the input by reading the restricted discharge processing flag Fr whose value is set to 0 when the restricted discharge processing is not executed and whose value is set to 1 when the restricted discharge processing is executed.

When the data is input in this manner, the electronic control unit 60 checks the value of the input parking request flag Fp (step S210). When the value of the parking request flag Fp is 0, the electronic control unit 60 determines that the shift position SP is not the parking position, and the routine returns to step S200. Then, when the value of the parking request flag Fp becomes 1, the electronic control unit 60 determines that the shift position SP is changed from the drive position to the parking position, and checks the value of the restricted discharge processing flag Fr (step S220).

When the value of the restricted discharge processing flag Fr is 1, the electronic control unit 60 determines that the restricted discharge processing is being executed, and turns OFF the magnetic lock device 40 (step S230). Then, this routine ends. As described above, when the restricted discharge processing is executed, the hydraulic oil in the oil chamber 11f and the oil passage 28 is discharged while the movement of the piston rod 12 to the lock side is restricted by the magnetic lock device 40. Accordingly, when the magnetic lock device 40 is turned OFF, the piston rod 12 and the piston 14 quickly move to the lock side (lower side in FIG. 4) due to the urging force of the return spring 16 while moving the lock shaft 41 and the shaft member 51 toward the rear cap 57 by the rightward component (FIG. 4) of the force applied from the roller 13 to the second abutting surface 412, and stop at a position such that the first predetermined interval is formed between the roller 13 and the first abutting surface 411 of the lock shaft 41 as illustrated in FIG. 4. Note that when the abutment between the roller 13 and the second abutting surface 412 ends, the lock shaft 41 and the shaft member 51 move toward the piston rod 12 (to the left in FIG. 4) due to the urging force of the spring 58. When the piston rod 12 thus moves to the lock side, the detent lever 8 turns counterclockwise in FIG. 1 about the support shaft 8s, and the parking rod 4 moves to the left in FIG. 1. Then, the parking pawl 3 is pressed by the cam member 5, which is urged by the cam spring 7, to engage the parking gear 2, so that the parking lock state is established.

It requires a certain amount of time to discharge hydraulic oil in the oil chamber 11f due to the passage resistance of the oil passage 28 between the oil chamber 11f and the switching valve 21 and the oil passing resistance of the switching valve 21. Therefore, in the case where discharge of the hydraulic oil in the oil chamber 11f is started when the shift position SP is changed from the drive position to the parking position, the longer the time required to discharge the hydraulic oil, the longer the time required to move the piston rod 12 to the lock side and establish the parking lock state from when the shift position SP is changed (hereinafter referred to as the required time for switching). When the oil temperature Toil of hydraulic oil is high, the viscosity thereof is not very high, and therefore the time required for switching is not very long. However, when the oil temperature Toil of hydraulic oil is low, the viscosity thereof is high, and therefore the time required for switching might be relatively long. In view of this, if the oil temperature Toil of the hydraulic oil in the hydraulic control device 20 and the oil chamber 11f is low, when the vehicle is predicted to stop while traveling, discharge of the hydraulic oil in the oil chamber 11f and the oil passage 28 is started while the movement of the piston rod 12 to the lock side is restricted by the magnetic lock device 40. Further, when the vehicle stops and the shift position SP is changed from the drive position to the parking position, the movement of the piston rod 12 to the lock side is allowed by turning OFF the magnetic lock device 40. Thus, it is possible to reduce the time required to establish the parking lock state from when the shift position SP is changed.

When the value of the restricted discharge processing flag Fr is 0 in step S220, the electronic control unit 60 determines that the restricted discharge processing is not being executed, that is, the parking lock release state is maintained by the hydraulic pressure supplied from the hydraulic control device 20 to the oil chamber 11f, and turns OFF the on-off solenoid valve 22 (step S240). Then, this routine ends. Thus, the switching valve 21 is switched from the first state to the second state, so that the line pressure PL is not supplied to the oil chamber 11f of the hydraulic actuator 10, and the hydraulic oil in the oil chamber 11f and the oil passage 28 starts to be discharged from the drain port 21d of the switching valve 21 via the oil hole 11h and the oil passage 28. Then, the piston rod 12 and the piston 14 move to the lock side (lower side in FIG. 4) due to the urging force of the return spring 16 while moving the lock shaft 41 and the shaft member 51 toward the rear cap 57, and stop at a position such that the first predetermined interval is formed between the roller 13 and the first abutting surface 411 of the lock shaft 41 as illustrated in FIG. 4. As described above, in this embodiment, if the oil temperature Toil of the hydraulic oil in the hydraulic control device 20 and the oil chamber 11f is high to some extent, the required time for switching is not very long. Therefore, when the shift position SP is changed from the drive position to the parking position, discharge of the hydraulic oil in the oil chamber 11f is started so as to switch from the parking lock release state to the parking lock state.

Figure 7:
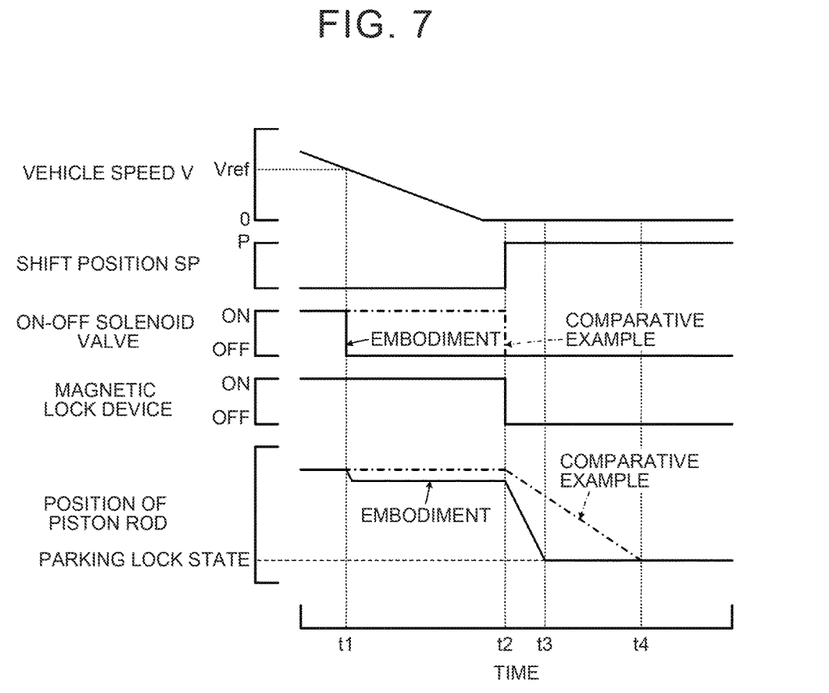
FIG. 7 is an explanatory diagram illustrating an example of temporal changes in a vehicle speed V, a shift position SP, the state of an on-off solenoid valve 22, the state of a magnetic lock device 40, and the position of a piston rod 12 when an oil temperature Toil of a hydraulic control device or controller 20 and an oil chamber 11f is low.

FIG. 7 is an explanatory diagram illustrating an example of temporal changes in the vehicle speed V, the shift position SP, the state of the on-off solenoid valve 22, the state of the magnetic lock device 40, and the position of the piston rod 12 when the oil temperature Toil of the hydraulic control device 20 and the oil chamber 11f is low (when the oil temperature Toil is equal to or lower than the threshold Toref). In the figure, the solid lines indicate changes in the embodiment, and the one-dot chain lines indicate changes in a comparative example in which no prediction is made as to whether the vehicle stops (the restricted discharge processing is not executed). In the comparative example, as indicated by the one-dot chain lines in the figure, the vehicle speed V decreases and the vehicle stops. Then, at time t2 when the shift position SP is changed to the parking position, the on-off solenoid valve 22 is turned OFF, so that the piston rod 12 moves to the lock side due to the elastic force of the return spring 16 in response to reduction in the hydraulic pressure of the oil chamber 11f. Then at time t4, the parking lock state is established. Therefore, it takes a relatively long time to establish the parking lock state from when the shift position SP is changed to the parking position. On the other hand, in the embodiment, at time t1 when the vehicle speed V decreases and the vehicle is predicted to stop (the shift position SP is predicted to be operated to the parking position), the on-off solenoid valve 22 is turned OFF and the above-described restricted discharge processing is executed. Then, at time t2, the magnetic lock device 40 is turned OFF, so that the piston rod 12 moves to the lock side. Then, at time t3 preceding the time t4, the parking lock state is established. That is, since discharge of the hydraulic oil in the oil chamber 11f is started before time t2, it is possible to reduce the time required to establish the parking lock state from when the shift position SP is changed to the parking position.

In the parking device 1 of this embodiment described above, when the oil temperature Toil of the hydraulic oil in the hydraulic control device 20 and the oil chamber 11f is low, and before establishment of the parking lock state is requested, more specifically, when the shift position SP is predicted to be changed to the parking position (the vehicle is predicted to stop while traveling), the restricted discharge processing is executed in which the magnetic lock device 40 is turned ON and the on-off solenoid valve 22 is turned OFF. Thus, discharge of the hydraulic oil in the oil chamber 11f is started while the movement of the piston rod 12 is restricted by the magnetic lock device 40. Then, when the vehicle stops and the shift position SP is changed to the parking position, the restriction on the movement of the piston rod 12 is removed by turning OFF the magnetic lock device 40. Thus, the piston rod 12 moves to the lock side, so that the parking lock state is established. With this processing, compared to the configuration in which discharge of the hydraulic oil in the oil chamber 11*f* is started when the shift position SP is changed to the parking position, it is possible to reduce the time required to establish the parking lock state from when the shift position SP is changed to the parking position.

Further, in the parking device 1 of this embodiment, after execution of the restricted discharge processing is started, when the movement of the piston rod 12 is not restricted, the on-off solenoid valve 22 is turned ON again. Thus, the parking lock release state is maintained by the hydraulic pressure supplied from the hydraulic control device 20 to the oil chamber 11*f*. Accordingly, it is possible to prevent the parking device 1 from switching to the parking lock state.

Note that in the parking device 1 of this embodiment, the hydraulic actuator 10 and the magnetic lock device 40 are disposed such that the axial direction of the piston rod 12 and the axial direction of the lock shaft 41 and the shaft member 51 are orthogonal to each other. Therefore, compared to the configuration in which these components are disposed coaxially with each other, the parking device 1 can be easily disposed in a limited space inside or outside the transmission case.

In the parking device 1 of this embodiment, the restricted discharge processing is executed when the oil temperature Toil of the hydraulic oil in the hydraulic control device 20 and the oil chamber 11*f* is low and when the vehicle is predicted to stop while traveling (the shift position SP is predicted to be operated to the parking position). However, the restricted discharge processing may be executed when the vehicle is predicted to stop while travelling, regardless of the oil temperature Toil of the hydraulic oil in the hydraulic control device 20 and the oil chamber 11*f*.

In the parking device 1 of this embodiment, when switching from the parking lock release state to the parking lock state, the piston rod 12 moves to the lock side due to the urging force of the return spring 16 while moving the lock shaft 41 and the shaft member 51 toward the rear cap 57. In this case, hydraulic pressure (hydraulic oil) may be supplied from the hydraulic control device 20 to the spring chamber 11*s* of the hydraulic actuator 10. With this configuration, it is possible to move the piston rod 12 to the lock side more quickly.

In the parking device 1 of this embodiment, the magnetic lock device 40 is configured to, when the coil 54 is not energized, restrict the movement of the piston rod 12 by fixing the lock shaft 41 to the piston rod 12 side by the attraction force between the permanent magnet 53 of the shaft member 51 and the flange portion 55*a* of the yoke 55 (and the elastic force of the spring 58), and when the coil 54 is energized, allow the movement of the piston rod 12 by cancelling the attraction force between the permanent magnet 53 and the flange portion 55*a* and thus unfixing the lock shaft 41. However, the magnetic lock device 40 may have any configuration capable of restricting the movement of the piston rod 12 and removing the restriction (allowing the movement) by the elastic force and the magnetic force. For example, the magnetic lock device 40 may use a plunger 52B with the same shape as that of the above-described shaft member 51 instead of having the permanent magnet 53 such that, when the coil 54 is not energized, the movement of the piston rod 12 is allowed without fixing the lock shaft 41, and when the coil 54 is energized, the movement of the piston rod 12 is restricted by attracting the plunger 52B toward the flange portion 55*a* of the yoke 55 and thus fixing the lock shaft 41 to the piston rod 12 side. Alternatively, the magnetic lock device 40 may use a plunger 52C with the same shape as that of the plunger 52B such that, when the coil 54 is not energized, the movement of the piston rod 12 is restricted by fixing the lock shaft 41 to the piston rod 12 side by the elastic force of the elastic member, and when the coil 54 is energized, the movement of the piston rod 12 is allowed by attracting the plunger 52C to the side away from the piston rod 12 against the elastic force of the elastic member. Further, the magnetic lock device 40 may use a plunger 52D with the same shape as that of the plunger 52B such that, when the coil 54 is not energized, the movement of the piston rod 12 is allowed by urging the lock shaft 41 to the side away from the piston rod 12 by the elastic force of the elastic member, and when the coil 54 is energized, the movement of the piston rod 12 is restricted by attracting the plunger 52D toward the piston rod 12 and thus fixing the lock shaft 41 against the elastic force of the elastic member.

In the parking device 1 of this embodiment, the lock shaft 41 and the shaft member 51 (the plunger 52 and the permanent magnet 53) of the magnetic lock device 40 are formed separately from each other. However, the lock shaft 41 and the shaft member 51 may be formed integrally with each other.

In the parking device 1 of this embodiment, the magnetic lock device 40 restricts the movement of the piston rod 12 by using the lock shaft 41 and the shaft member 51 that move in a direction (left-right direction in FIG. 1) orthogonal to the axial direction (up-down direction in FIG. 1) of the piston rod 12. However, the magnetic lock device 40 may restrict the movement of the piston rod 12 by using a member that moves in a direction coaxial with the axial direction of the piston rod 12.

In the following, a parking device according to the present disclosure will be described.

The parking device according to the present disclosure is mounted on a vehicle and establishes a parking lock state and a parking lock release state, the parking device including: a moving member that moves in a first direction; a first elastic member that urges the moving member to a lock side in the first direction by an elastic force of the first elastic member to establish the parking lock state; hydraulic oil supply for moving the moving member to a lock release side in the first direction to establish the parking lock release state, by supplying hydraulic oil to a hydraulic oil chamber defined by the moving member and a housing accommodating the moving member; a movement restriction unit that restricts movement of the moving member in the first direction and removes the restriction; and a controller for, when the parking lock release state is established and before establishment of the parking lock state is requested, executing restricted discharge processing of causing the hydraulic oil supply to discharge the hydraulic oil in the hydraulic oil chamber under the restriction by the movement restriction unit on the movement of the moving member to the lock side, and when the vehicle stops and establishment of the parking lock state is requested, removing the restriction by the movement restriction unit on the moving member.

In the parking device according to the present disclosure, when the parking lock release state is established and before establishment of the parking lock state is requested, restricted discharge processing of causing the hydraulic oil supply to discharge the hydraulic oil in the hydraulic oil chamber under the restriction by the movement restriction unit on the movement of the moving member to the lock side is executed, and when the vehicle stops and establishment of the parking lock state is requested, the restriction by the movement restriction unit on the moving member is removed. That is, before establishment of the parking lock state is requested, the hydraulic oil in the hydraulic oil chamber is discharged by the hydraulic oil supply, while maintaining the parking lock release state by causing the movement restriction unit to restrict the movement of the moving member to the lock side. Further, when establishment of the parking lock state is requested, restriction by the movement restriction unit on the moving member is removed, and thus the moving member is moved to the lock side by the elastic force of the first elastic member, so that the parking lock state is established. Accordingly, compared to the configuration in which discharge of the hydraulic oil in the hydraulic oil chamber is started after establishment of the parking lock state is requested, it is possible to reduce the time required to establish the parking lock state from when establishment of the parking lock state is requested. Here, a time "before establishment of the parking lock state is requested" may be a time when a shift lever is predicted to be operated to a parking position. Further, the time "when the shift lever is predicted to be operated to the parking position" may be a time when a vehicle speed is reduced to a predetermined vehicle speed or less, especially a time when the vehicle speed is reduced to a predetermined vehicle speed or less after exceeding the predetermined speed (a time when the vehicle speed is reduced to the predetermined vehicle speed or less upon deceleration while the vehicle is traveling). Further, "a request of establishment of the parking lock state" may be an operation of the shift lever to the parking position.

The parking device according to the present disclosure may be configured such that: the controller executes the restricted discharge processing when an oil temperature of the hydraulic oil is equal to or lower than a predetermined temperature and before establishment of the parking lock state is requested, and does not execute the restricted discharge processing when the oil temperature of the hydraulic oil is higher than the predetermined temperature and before establishment of the parking lock state is requested. Further, if the restricted discharge processing is not executed, when establishment of the parking lock state is requested, the controller causes the hydraulic oil supply to discharge the hydraulic oil in the hydraulic oil chamber.

Further, the parking device according to the present disclosure may be configured such that when the restricted discharge processing is executed, if the movement of the moving member to the lock side is not restricted by the movement restriction unit, the controllers causes the hydraulic oil supply to supply hydraulic oil to the hydraulic oil chamber again. With this configuration, it is possible to prevent the parking lock state from being established when the movement of the moving member to the lock side is not restricted by the movement restriction unit.

Further, the parking device according to the present disclosure may be configured such that the movement restriction unit includes a movement restriction member that moves in a second direction orthogonal to the first direction and that has an abutting portion at a distal end portion thereof, the abutting portion abutting against an abutted portion provided in the moving member, the movement restriction unit being configured to, when the abutted portion and the abutting portion abut against each other, restrict the movement of the moving member in the first direction by locking the movement restriction member by an elastic force or a magnetic force.

Further, the parking device according to the present disclosure may be configured such that the hydraulic oil supply includes a switching valve that switches a first state in which a line pressure is supplied to the hydraulic oil chamber via a predetermined oil passage and a second state in which the hydraulic oil in the hydraulic oil chamber and the predetermined oil passage is drained.

In the following, a description will be given of the corresponding relationship between the main elements of the embodiment and the main elements of the disclosure described in the SUMMARY. In the embodiment, the piston rod 12 corresponds, for example, to the "moving member"; the return spring 16 corresponds, for example, to the "first elastic member"; the hydraulic control device 20 corresponds, for example, to the "hydraulic oil supply"; the magnetic lock device 40 corresponds, for example, to the "movement restriction unit"; and the electronic control unit 60 corresponds, for example, to the "controller".

Note that the embodiment is merely a specific example of a mode for carrying out the disclosure described in the SUMMARY.

Although a mode for carrying out the present disclosure is described above, the present disclosure is not limited in any manner to the embodiment and may be carried out in various forms without departing from the scope of the present disclosure.

INDUSTRIAL APPLICABILITY

The present disclosure is applicable, for example, in the industry of manufacturing parking devices and the like.

The invention claimed is:

1. A parking device that is mounted on a vehicle and establishes a parking lock state and a parking lock release state, the parking device comprising:
   a moving member that moves in a first direction;
   a first elastic member that urges the moving member to a lock side in the first direction by an elastic force of the first elastic member to establish the parking lock state;
   hydraulic oil supply for moving the moving member to a lock release side in the first direction to establish the parking lock release state, by supplying hydraulic oil to a hydraulic oil chamber defined by the moving member and a housing accommodating the moving member;
   a movement restriction unit that restricts movement of the moving member in the first direction and removes the restriction; and
   a controller for, when the parking lock release state is established and before establishment of the parking lock state is requested, executing restricted discharge processing of causing the hydraulic oil supply to discharge the hydraulic oil in the hydraulic oil chamber under the restriction by the movement restriction unit on the movement of the moving member to the lock side, and when the vehicle stops and establishment of the parking lock state is requested, removing the restriction by the movement restriction unit on the moving member,
   wherein a time before establishment of the parking lock state is requested is a time when a shift lever is predicted to be operated to a parking position.

2. The parking device according to claim 1, wherein the time when the shift lever is predicted to be operated to the parking position is a time when a vehicle speed is reduced to a predetermined vehicle speed or less.

3. A parking device that is mounted on a vehicle and establishes a parking lock state and a parking lock release state, the parking device comprising:
  a moving member that moves in a first direction;
  a first elastic member that urges the moving member to a lock side in the first direction by an elastic force of the first elastic member to establish the parking lock state;
  hydraulic oil supply for moving the moving member to a lock release side in the first direction to establish the parking lock release state, by supplying hydraulic oil to a hydraulic oil chamber defined by the moving member and a housing accommodating the moving member;
  a movement restriction unit that restricts movement of the moving member in the first direction and removes the restriction; and
  a controller for, when the parking lock release state is established and before establishment of the parking lock state is requested, executing restricted discharge processing of causing the hydraulic oil supply to discharge the hydraulic oil in the hydraulic oil chamber under the restriction by the movement restriction unit on the movement of the moving member to the lock side, and when the vehicle stops and establishment of the parking lock state is requested, removing the restriction by the movement restriction unit on the moving member, wherein:
  the controller executes the restricted discharge processing when an oil temperature of the hydraulic oil is equal to or lower than a predetermined temperature and before establishment of the parking lock state is requested, and does not execute the restricted discharge processing when the oil temperature of the hydraulic oil is higher than the predetermined temperature and before establishment of the parking lock state is requested; and
  if the restricted discharge processing is not executed, when establishment of the parking lock state is requested, the controller causes the hydraulic oil supply to discharge the hydraulic oil in the hydraulic oil chamber.

4. The parking device according to claim 3, wherein when the restricted discharge processing is executed, if the movement of the moving member to the lock side is not restricted by the movement restriction unit, the controller causes the hydraulic oil supply to supply hydraulic oil to the hydraulic oil chamber again.

5. The parking device according to claim 3, wherein the movement restriction unit includes a movement restriction member that moves in a second direction orthogonal to the first direction and that has an abutting portion at a distal end portion of the movement restriction member, the abutting portion abutting against an abutted portion provided in the moving member, the movement restriction unit being configured to, when the abutted portion and the abutting portion abut against each other, restrict the movement of the moving member in the first direction by locking the movement restriction member by an elastic force or a magnetic force.

6. The parking device according to claim 3, wherein the hydraulic oil supply includes a switching valve that switches a first state in which a line pressure is supplied to the hydraulic oil chamber via a predetermined oil passage and a second state in which the hydraulic oil in the hydraulic oil chamber and the predetermined oil passage is drained.

7. The parking device according to claim 1, wherein:
the controller executes the restricted discharge processing when an oil temperature of the hydraulic oil is equal to or lower than a predetermined temperature and before establishment of the parking lock state is requested, and does not execute the restricted discharge processing when the oil temperature of the hydraulic oil is higher than the predetermined temperature and before establishment of the parking lock state is requested; and
if the restricted discharge processing is not executed, when establishment of the parking lock state is requested, the controller causes the hydraulic oil supply to discharge the hydraulic oil in the hydraulic oil chamber.

8. The parking device according to claim 1, wherein when the restricted discharge processing is executed, if the movement of the moving member to the lock side is not restricted by the movement restriction unit, the controller causes the hydraulic oil supply to supply hydraulic oil to the hydraulic oil chamber again.

9. The parking device according to claim 1, wherein the movement restriction unit includes a movement restriction member that moves in a second direction orthogonal to the first direction and that has an abutting portion at a distal end portion of the movement restriction member, the abutting portion abutting against an abutted portion provided in the moving member, the movement restriction unit being configured to, when the abutted portion and the abutting portion abut against each other, restrict the movement of the moving member in the first direction by locking the movement restriction member by an elastic force or a magnetic force.

10. The parking device according to claim 1, wherein the hydraulic oil supply includes a switching valve that switches a first state in which a line pressure is supplied to the hydraulic oil chamber via a predetermined oil passage and a second state in which the hydraulic oil in the hydraulic oil chamber and the predetermined oil passage is drained.

* * * * *